United States Patent
Seregin et al.

(10) Patent No.: US 9,521,410 B2
(45) Date of Patent: Dec. 13, 2016

(54) QUANTIZATION PARAMETER (QP) CODING IN VIDEO CODING

(71) Applicant: QUALCOMM Incorporated, San Diego, CA (US)

(72) Inventors: Vadim Seregin, San Diego, CA (US); Xianglin Wang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 229 days.

(21) Appl. No.: 13/870,149

(22) Filed: Apr. 25, 2013

(65) Prior Publication Data

US 2013/0287103 A1 Oct. 31, 2013

Related U.S. Application Data

(60) Provisional application No. 61/639,015, filed on Apr. 26, 2012, provisional application No. 61/643,821, filed on May 7, 2012, provisional application No. 61/656,953, filed on Jun. 7, 2012.

(51) Int. Cl.
  *H04N 19/124* (2014.01)
  *H04N 19/61* (2014.01)
  *H04N 19/70* (2014.01)
  *H04N 19/126* (2014.01)

(52) U.S. Cl.
  CPC ...... *H04N 19/00781* (2013.01); *H04N 19/124* (2014.11); *H04N 19/126* (2014.11); *H04N 19/61* (2014.11); *H04N 19/70* (2014.11)

(58) Field of Classification Search
  CPC .................................................. H04N 19/70
  See application file for complete search history.

(56) References Cited

U.S. PATENT DOCUMENTS

| | | | |
|---|---|---|---|
| 7,688,891 B2 | 3/2010 | Kondo et al. | |
| 8,184,711 B2 | 5/2012 | Horiuchi et al. | |
| 8,582,646 B2 * | 11/2013 | Liu et al. | 375/240.03 |

(Continued)

FOREIGN PATENT DOCUMENTS

| | | |
|---|---|---|
| WO | 2006099229 A1 | 9/2006 |
| WO | 2012120822 A1 | 9/2012 |
| WO | 2013003284 A1 | 1/2013 |

OTHER PUBLICATIONS

Aoki, et al., "Prediction-based QP derivation", Mar. 10, 2011,No. JCTVC-E215, Mar. 10, 2011, XP030008721,ISSN: 0000-0007, 11 pp.

(Continued)

*Primary Examiner* — Christopher Findley
(74) *Attorney, Agent, or Firm* — Shumaker & Sieffert, P.A.

(57) ABSTRACT

A method of coding delta quantization parameter values is described. In one example a video decoder may receive a delta quantization parameter (dQP) value for a current quantization block of video data, wherein the dQP value is received whether or not there are non-zero transform coefficients in the current quantization block. In another example, a video decoder may receive the dQP value for the current quantization block of video data only in the case that the QP Predictor for the current quantization block has a value of zero, and infer the dQP value to be zero in the case that the QP Predictor for the current quantization block has a non-zero value, and there are no non-zero transform coefficients in the current quantization block.

20 Claims, 9 Drawing Sheets

(56) References Cited

U.S. PATENT DOCUMENTS

| | | | |
|---|---|---|---|
| 2011/0274162 A1* | 11/2011 | Zhou et al. | 375/240.03 |
| 2012/0114034 A1 | 5/2012 | Huang et al. | |
| 2013/0051457 A1 | 2/2013 | Joshi et al. | |
| 2013/0077696 A1* | 3/2013 | Zhou | 375/240.24 |
| 2013/0083845 A1* | 4/2013 | Yu et al. | 375/240.03 |
| 2013/0114693 A1* | 5/2013 | Gao et al. | 375/240.03 |

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Budagavi, et al., "Delta QP signaling at sub-LCU level", JCT-VC Meeting; MPEG Meeting; Jan. 20, 2011-Jan. 28, 2011; Daegu; (Joint Collaborative Team on Video Coding of ISO / IEC JTC1/SC29/WG11and ITU-TSG. 16) ; URL: http://wftp3.itu.int/av-arch/jctvc-site/, No. JCTVC-D038, XP030008079, ISSN: 0000-0015, 5 pp.

International Search Report and Written Opinion—PCT/US2013/038383—ISA/EPO—Jul. 1, 2013, 14 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Sato et al: "Preliminary Implementation on Sub-LCU-Level DeltaQP", Mar. 10, 2011, No. JCTVC-E220, Mar. 10, 2011, XP030008726, ISSN:0000-0007, 4 pp.

Kobayashi et al: "Sub-LCU level delta QP signaling", MPEG Meeting; Mar. 21, 2011-Mar. 25, 2011; Geneva; (Motion Picture Expert Group or ISO/IEC JTC1/SC29/WG11), No. m19716, XP030048283, 10 pp.

Coban et al: "CU-Level QP Prediction", JCT-VC Meeting; MPEG Meeting; Mar. 16, 2011-Mar. 23, 2011; Geneva; (Joint Collaborative Team on Video Coding of ISO/IEC JTC1/SC29/WG11and ITU-T SG.16); URL: http://wftp3.itu.int/av-arch/jctvc-site/, No. JCTVC-E391, XP030008897, 4 pp.

Pang et al: "Improved dQP Calculation Method", 20110310, No. JCTVC-E217, Mar. 10, 2011, XP030008723, 4 pp.

Sato et al: "Description of Core Experiment 4 (CE4): Quantization", Document: JCTVC-E704r1; MPEG Meeting; Mar. 21, 2011-Mar. 25, 2011; Geneva; (Motion Picture Expert Group or ISO/IEC JTC1/SC29/WG11), No. m20249, 10 pp.

Chuang et al: "AhG Quantization: Sub-LCU Delta QP", Mar. 7, 2011, No. JCTVC-E051, Mar. 7, 2011, XP030008557, 6 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

International Preliminary Report on Patentability from International Application No. PCT/US2013/038383, dated Aug. 14, 2014, 10 pp.

Second Written Opinion from International Application No. PCT/US2013/038383, dated May 26, 2014, 10 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

* cited by examiner

QP PREDICTOR = (QP LEFT QUANTIZATION BLOCK + QP ABOVE QUANTIZATION BLOCK) / 2

QUANTIZATION PARAMETER (QP) CODING IN VIDEO CODING

This application claims the benefit of:

U.S. Provisional Application No. 61/639,015, filed Apr. 26, 2012;

U.S. Provisional Application No. 61/643,821, filed May 7, 2012; and

U.S. Provisional Application No. 61/656,953, filed Jun. 7, 2012, the entire content of each of which is incorporated by reference herein.

TECHNICAL FIELD

This disclosure relates to video coding, and more particularly to techniques for quantization parameter coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. A video frame alternatively may be referred to as a picture. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded, i.e., the coded block, and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes techniques for coding video data. In particular, this disclosure describes techniques for coding delta Quantization Parameter (dQP) values and identifying lossless coding modes in order to avoid potential encoder/decoder mismatches.

In one example, this disclosure describes a video decoding method comprising receiving a delta quantization parameter (dQP) value for a current quantization block of video data, wherein the dQP value is received whether or not there are non-zero transform coefficients in the current quantization block, determining a quantization parameter (QP) value for the current quantization block based on the received dQP value and a QP Predictor, and decoding the current quantization block using the determined QP value.

In another example, the video decoding method comprises receiving a dQP value for the current quantization block of video data only in the case that the QP Predictor for the current quantization block has a value of zero, and inferring the dQP value to be zero in the case that the QP Predictor the for the current quantization block has a non-zero value, and there are no non-zero transform coefficients in the current quantization block.

In another example, this disclosure describes a video encoding method comprising determining a QP value for a current quantization block of video data, determining a dQP value for the current quantization block based on the QP and a QP predictor, generating the dQP value, wherein the dQP value is signaled whether or not there are non-zero transform coefficients in the current quantization block, and encoding the current quantization block using the determined QP value.

In another example, the video encoding method comprises generating a dQP value for the current quantization block of video data only in the case that the QP Predictor for the current quantization block has a value of zero, and inferring the dQP value to be zero in the case that the QP Predictor the for the current quantization block has a non-zero value, and there are no non-zero transform coefficients in the current quantization block.

This disclosure also describes a video encoder, a video decoder, apparatuses, devices, and computer-readable media storing instructions that may be configured to perform the techniques for signaling transform coefficients described herein.

The details of one or more examples are set forth in the accompanying drawings and the description below. Other features, objects, and advantages will be apparent from the description and drawings, and from the claims.

DETAILED DESCRIPTION

In general, this disclosure describes techniques for coding video data. In particular, this disclosure describes techniques for quantization parameter (QP) coding in a video encoding and/or decoding process.

Consistent with some proposals for the HEVC standard, a video block may comprise a largest coding unit (LCU) that itself may be sub-divided into smaller coding units (CUs) according to a quadtree partitioning scheme, and possibly further partitioned into prediction units (PUs) for purposes of motion estimation and motion compensation. This disclosure describes techniques for encoding changes (i.e., deltas) in a quantization parameter (i.e., the delta QP or dQP) for an LCU, CU or a quantization group (or some other block or group of blocks sized large enough that quantization changes are supported). In this case, the delta QP may define the change in the QP for the quantization group relative to a predicted value of the QP for the LCU. For example, the predicted QP value for the LCU may simply be the QP of a previous quantization group (i.e., previously coded in the bitstream). Alternatively, the predicted QP value may be determined based on rules. For example, the rules may identify one or more other QP values of other quantization groups, or average QP value that should be used.

Current techniques of dQP signaling in the HEVC standard present certain problems when used in conjunction with signaling and parsing lossless coding modes. As will be discussed in more detail below, in certain situations, encoder/decoder mismatch may occur, particularly when lossless coding is used. As such, this disclosure presents techniques for dQP and lossless mode coding to avoid such encoder/decoder mismatches.

Figure 1:
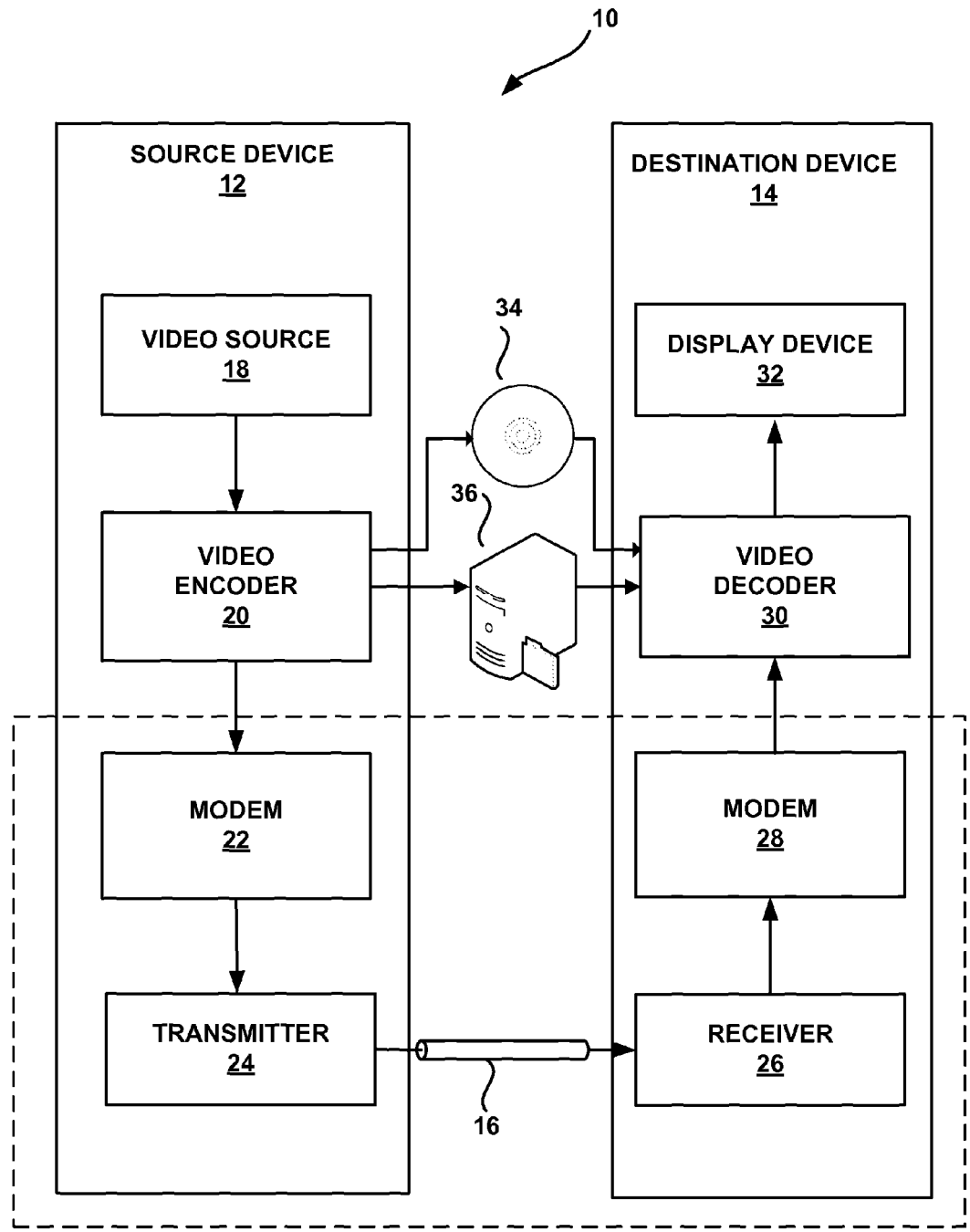
FIG. 1 is a block diagram illustrating an example video encoding and decoding system.

FIG. 1 is a block diagram illustrating an example video encoding and decoding system 10 that may be configured to utilize techniques for QP coding in accordance with examples of this disclosure. As shown in FIG. 1, system 10 includes source device 12 that transmits encoded video to destination device 14 via communication channel 16. Encoded video data may also be stored on storage medium 34 or file server 36 and may be accessed by destination device 14 as desired. When stored to storage medium 34 or file server 36, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

Source device 12 and destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, communication channel 16 may comprise a wireless channel, a wired channel, or a combination of wireless and wired channels suitable for transmission of encoded video data. Similarly, file server 36 may be accessed by destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for QP coding, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, modulator/demodulator 22 and transmitter 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones, which may be provided, e.g., within smartphones or tablet computers. However, the techniques described in this disclosure may be applicable to video coding in general, and may be applied to wireless and/or wired applications, or application in which encoded video data is stored on a local disk.

The captured, pre-captured, or computer-generated video may be encoded by video encoder 20. The encoded video information may be modulated by modem 22 according to a communication standard, such as a wired or wireless communication protocol, and transmitted to destination device 14 via transmitter 24. Modem 22 may include various mixers, filters, amplifiers or other components designed for signal modulation. Transmitter 24 may include circuits designed for transmitting data, including amplifiers, filters, and, in the case of wireless communication, one or more antennas.

The captured, pre-captured, or computer-generated video that is encoded by video encoder 20 may also be stored onto storage medium 34 or file server 36 for later consumption. Storage medium 34 may include Blu-ray discs, DVDs, CD-ROMs, flash memory, or any other suitable digital storage media for storing encoded video. The encoded video stored on the storage medium 34 may then be accessed by destination device 14 for decoding and playback. Although not shown in FIG. 1, in some examples, storage medium 34 and/or file server 36 may store the output of transmitter 24.

File server 36 may be any type of server capable of storing encoded video and transmitting that encoded video to destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. File server 36 may be accessed by destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

Destination device 14, in the example of FIG. 1, includes receiver 26, modem 28, video decoder 30, and display device 32. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding video data. Such syntax may also be included with the encoded video data stored on storage medium 34 or file server 36. Each of video encoder 20 and video decoder 30 may form part of a respective encoder-decoder (CODEC) that is capable of encoding or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). One draft of the HEVC standard, referred to as "HEVC Working Draft 7" or "WD 7," is described in document JCTVC-I1003, Bross et al., "High efficiency video coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, Switzerland, Apr. 27, 2012 to May 7, 2012 which, as of Apr. 25, 2013, is downloadable from http://phenix.it-sudparis.eu/jct/doc_end_user/documents/9_Geneva/wg11/JCTVC-I1003-v3.zip, the entire content of which is incorporated herein by reference.

A more recent draft of the HEVC standard, referred to as "HEVC Working Draft 10" or "WD10," is described in document JCTVC-L1003v34, Bross et al., "High efficiency video coding (HEVC) text specification draft 10," Joint Collaborative Team on Video Coding (JCT-VC) of ITU-T SG16 WP3 and ISO/IEC JTC1/SC29/WG11, 12th Meeting: Geneva, CH, 14-23 Jan. 2013, which, as of Apr. 25, 2013, is downloadable from http://phenix.int-evry.fr/jct/doc_end_user/documents/12_Geneva/wg11/JCTVC-L1003-v34.zip. The entire content of HEVC WD10 is hereby incorporated herein by reference.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video encoder 20 may implement any or all of the techniques of this disclosure for QP coding in a video coding process. Likewise, video decoder 30 may implement any or all of these techniques for QP coding in a video coding process. A video coder, as described in this disclosure, may refer to a video encoder or a video decoder. Similarly, a video coding unit may refer to a video encoder or a video decoder. Likewise, video coding may refer to video encoding or video decoding.

In one example of the disclosure, as will be explained in more detail below, video encoder 20 may be configured to determine a quantization parameter (QP) value for a current quantization block, determine a delta quantization parameter (dQP) value for a current quantization block of video data based on the QP and a QP predictor, signal the dQP value, wherein the dQP value is signaled whether or not there are non-zero transform coefficients in the current quantization block, and encode the current quantization block using the determined QP value.

In another example, video encoder 20 may be configured to signal the dQP value for the current quantization block of video data only in the case that the QP Predictor for the current quantization block has a value of zero, and infer the dQP value to be zero in the case that the QP Predictor the for the current quantization block has a non-zero value, and there are no non-zero transform coefficients in the current quantization block.

Likewise, video decoder 30 may be configured to receive a dQP value for a current quantization block of video data, wherein the dQP value is received whether or not there are non-zero transform coefficients in the current quantization block, determine a QP value for the current quantization block based on the received dQP value and a QP Predictor, and decode the current quantization block using the determined QP value.

In another example, video decoder 30 may be configured to receive the dQP value for the current quantization block of video data only in the case that the QP Predictor for the current quantization block has a value of zero, and infer the dQP value to be zero in the case that the QP Predictor the for the current quantization block has a non-zero value, and there are no non-zero transform coefficients in the current quantization block.

Digital video devices implement video compression techniques to encode and decode digital video information more efficiently. Video compression may apply spatial (intra-frame) prediction and/or temporal (inter-frame) prediction techniques to reduce or remove redundancy inherent in video sequences.

The JCT-VC is working on development of the HEVC standard, e.g., as described in the HEVC WD10 discussed above. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes. The following section will discuss certain aspects of the HM in more detail.

For video coding according to the HEVC standard currently under development, a video frame may be partitioned into coding units. A coding unit (CU) generally refers to an image region that serves as a basic unit to which various coding tools are applied for video compression. A CU usually has a luminance component, denoted as Y, and two chroma components, denoted as U and V. Depending on the video sampling format, the size of the U and V components, in terms of number of samples, may be the same as or different from the size of the Y component.

A CU is typically square, and may be considered to be similar to a so-called macroblock, e.g., used in other video coding standards such as ITU-T H.264. Coding according to some of the presently proposed aspects of the developing HEVC standard will be described in this application for purposes of illustration. However, the techniques described in this disclosure may be useful for other video coding processes, such as those defined according to H.264 or other standard or proprietary video coding processes.

According to the HM, a CU may include one or more prediction units (PUs) and/or one or more transform units (TUs). Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block" or "portion" to refer to any of a CU, PU, or TU. In general, "portion" may refer to any sub-set of a video frame.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU.

A CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the CU defining the PU(s) may also describe, for example, partitioning of the CU into one or more PUs. Partitioning modes may differ depending on whether the CU is uncoded, intra-prediction mode encoded, or inter-prediction mode encoded. For intra coding, a PU may be treated the same as a leaf transform unit described below.

The emerging HEVC standard allows for transformations according to transform units (TUs), which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized. A TU includes a luma transform block and two chroma transform blocks. As such, any coding process discussed below that is applied to a TU, may be, in actuality, applied to the luma and chroma transform blocks.

In general, a PU refers to data related to the prediction process. For example, when the PU is intra-mode encoded, the PU may include data describing an intra-prediction mode for the PU. As another example, when the PU is inter-mode encoded, the PU may include data defining a motion vector for the PU.

In general, a TU is used for the transform and quantization processes. A given CU having one or more PUs may also include one or more transform units (TUs). Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

To code a block (e.g., a prediction unit of video data), a predictor for the block is first derived. The predictor, also referred to as a predictive block, can be derived either through intra (I) prediction (i.e., spatial prediction) or inter (P or B) prediction (i.e. temporal prediction). Hence, some prediction units may be intra-coded (I) using spatial prediction with respect to reference samples in neighboring reference blocks in the same frame (or slice), and other prediction units may be uni-directionally inter-coded (P) or bi-directionally inter-coded (B) with respect to blocks of reference samples in other previously-coded frames (or slices). In each case, the reference samples may be used to form a predictive block for a block to be coded.

Upon identification of a predictive block, the difference between the pixels in the original video data block and the pixels in its predictive block is determined. This difference may be referred to as the prediction residual data, and indicates the pixel differences between the pixel values in the block to the coded and the pixel values in the predictive block selected to represent the coded block. To achieve better compression, the prediction residual data may be transformed, e.g., using a discrete cosine transform (DCT), an integer transform, a Karhunen-Loeve (K-L) transform, or another transform to produce transform coefficients.

The residual data in a transform block, such as a TU, may be arranged in a two-dimensional (2D) array of pixel difference values residing in the spatial, pixel domain. A transform converts the residual pixel values into a two-dimensional array of transform coefficients in a transform domain, such as a frequency domain.

Quantization may be applied to the transform coefficients, and generally involves a process that limits the number of bits associated with any given transform coefficient. More specifically, quantization may be applied according to a quantization parameter (QP). Rather than signal the QP itself, a change (i.e., a delta) in the QP may be signaled with the LCU. The delta QP defines a change in the quantization parameter for the LCU relative to a predicted value for the QP for the LCU, such as the QP of a previously communicated CU or a QP defined by previous QPs and/or one or more rules. This disclosure concerns generating and signaling the delta QP within an encoded bitstream in a way that can improve quality (and possibly compression) in the HEVC standard.

For further compression, the transform coefficients may be quantized prior to entropy coding. An entropy coder then applies entropy coding, such as Context Adaptive Variable Length Coding (CAVLC), Context Adaptive Binary Arithmetic Coding (CABAC), Probability Interval Partitioning Entropy Coding (PIPE), or the like, to the quantized transform coefficients. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, Video encoder 20 may also entropy encode syntax elements associated with the encoded video data for use by video decoder 30 in decoding the video data.

As discussed above, a delta QP (also noted as dQP) may be signaled in the encoded video bitstream to code the QP for a block of video data. Delta QP is defined the difference between a current QP (i.e., the actual QP used for the current block) and a predictor of the current QP (QP Predictor). Based on the signaled dQP, the corresponding current QP value may be reconstructed by adding dQP to the value of the QP Predictor. That is, at video encoder 20, dQP is calculated as by subtracting a QP Predictor from the actual QP of the current block: dQP=Current QP−QP Predictor. At video decoder 30, the actual QP of the current block is reconstructed by adding the received dQP to the QP Predictor: Current QP=dQP+QP Predictor. In some examples, the QP Predictor is defined as the average of the actual QP values for a block above and a block to the left of the current block.

According to proposals for HEVC and HM, a Quantization Group (QG) is defined for signaling dQP. A QG is the minimum block size where dQP is signaled. A QG may consist of a single CU or multiple CUs. In many instances, the QG may be smaller than one or more possible CU sizes. For example, a QG may be defined and/or signaled to be a size of 16×16 pixels. In this example, it would be possible to have CUs of size 32×32 or 64×64.

In various examples, the size of a QG is signaled in the picture parameter set (PPS). However, a QG size may be signaled at other levels of the bitstream, including a slice header, adaptation parameter set (APS), sequence parameter set (SPS), and the like. If a CU has a size equal to or larger than the size of the QG, the dQP may be signaled for such a CU. However, for CUs that are smaller than the size of the QG, a common dQP is signaled and shared among all the CUs inside the QG. In some examples proposed for HEVC, the signaling of dQP for a certain block (CU or QG) is also dependent on whether there are non-zero coefficients in the block. The dQP is signaled in a block after (and sometimes only after) video encoder 20 determines that there are non-zero coefficients coded in the same block.

Figure 2:
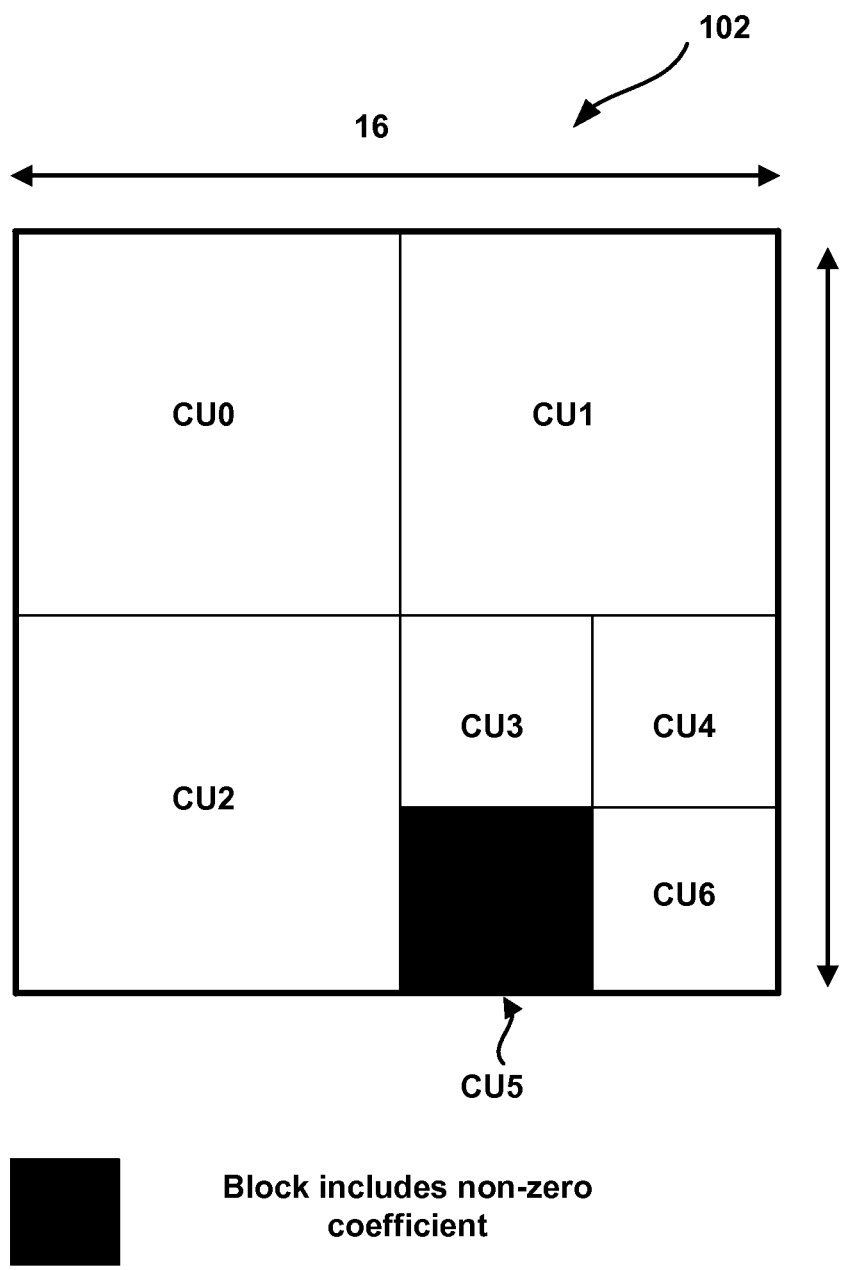
FIG. 2 is a conceptual diagram illustrating an example quantization group.

FIG. 2 shows an example of a 16×16 QG that includes 7 CUs (CU0-CU6). CU0-CU2 are 8×8 CUs, while CU3-CU6 are 4×4 CUs. In the example of FIG. 2, the shaded CU5 includes at least non-zero coefficient. As such, video encoder 20 signals one dQP for the entire QG 102, and video decoder 30 would apply the signaled dQP for use in decoding each of CU0-CU6. If no CU in QG 102 included a non-zero coefficient, a dQP would not be signaled for that QG. In current proposals for HEVC, whether or not a dQP is signaled for a certain block (e.g., a CU) is dependent on the QG size. If the QG size in the example of FIG. 2 were 8×8, no dQP would be signaled for CU0-CU2, as they do not include non-zero coefficients. However, one dQP would be signaled for CU3-CU6 to share, as each of these CUs is within a QG that contains at least one non-zero coefficient. Likewise, if the size of the signaled QG were 4×4, no dQP would be signaled for any block except for CU5 (i.e., the block having non-zero coefficients).

In other words, when there are multiple CUs in a QG, the dQP for the QG is not signaled unless a CU with non-zero coefficients is located within the QG. For example, if there are four CUs in a QG and none of the first three CUs have non-zero coefficient (also referred as non-zero CUs in the following description) except the fourth CU, the dQP is only signaled in the fourth CU. In general, the first non-zero CU in a QG can be located at any position inside the QG. For example, the first non-zero CU may be the first CU, the last CU, or any other CU in a QG. In some cases, no non-zero CUs may be present in a QG.

In the following description, the general term "quantization block" is used to refer to a CU that has a size larger than or equal to a signaled QG, or to refer to a QG containing a number of CUs. That is, a quantization block is a QG containing one or more CUs, or a CU that is larger than a QG. The term "zero block" will be used to indicate a block (e.g., a TU or transform block associated with a CU) that has no non-zero coefficients. When a quantization block is a QG containing multiple CUs, the QG is considered a zero block when all the CUs inside the QG are zero blocks. The dQP is signaled for each quantization block when the quantization block contains at least one non-zero coefficient.

Figure 3:
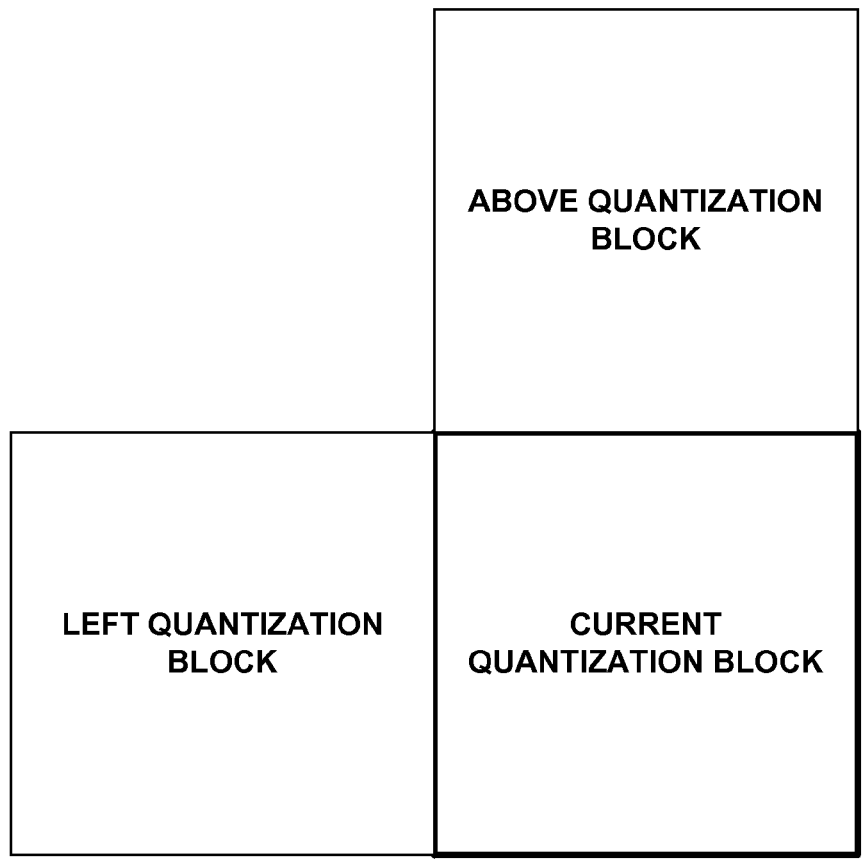
FIG. 3 is a conceptual diagram illustrating an example quantization parameter prediction technique.

When a dQP is not signaled for a quantization block, the value of the dQP is assumed to be zero. As such, at video decoder 30, the value of QP for the current block would be equal to the value of the QP Predictor (i.e., Current QP=dQP+QP Predictor, where dQP is assumed to be zero). According to the current proposals for HEVC and HM, QP Predictor is defined as the average of the QP values for the left quantization block and the above quantization block, as shown on FIG. 3 (i.e., showing QP prediction for a current quantization block using the left and above quantization blocks). The QP Predictor can be defined in different ways in other examples. For example, the QP Predictor may also be defined as the QP value from the left quantization block, defined as the QP value of the previously coded quantization block in a stream, or defined in other ways.

In current proposals for HEVC, a lossless coding mode is defined for coding a block (e.g., one or more CUs). According to this loss less coding mode, some coding operations, such as transform, quantization and in-loop filtering, are skipped. In current proposals for HEVC, the lossless coding mode may be indicated by video encoder 20 by using a QP value equal to zero for the block coded by the lossless coding mode. So, if a particular quantization block is coded in lossless mode, the QP value for this quantization block should be set to zero and signaled to decoder. In this case, the signaling of the QP value is achieved through sending a dQP with a value equal to minus QP Predictor value, i.e., dQP=Actual QP (zero in this case)−QP Predictor.

Certain issues may arise when dQP signaling for a quantization block is used in conjunctions with a lossless coding mode indicated with a QP value of zero. Such issues can lead to the encoder/decoder mismatch, and potentially, a decoder crash.

To explain the first issue, assume that QP Predictor derived for a current quantization block is zero. For example, the left quantization block and the above quantization block are both coded lossless coding mode, and thus each of a QP of zero. The QP Predictor may also be zero in the case that one of the left or the above quantization blocks is coded in lossless coding mode, and the other quantization block has a QP of 1. The QP Predictor, in this case, is the average of the two blocks, i.e., 0.5, and is rounded down to zero. Also assume that the current quantization block is normally (i.e., not losslessly) coded using a non-zero QP value. As such, transform, quantization, and all in-loop filtering processes are applied for the current quantization block.

In this case, if the quantization block is a zero block (i.e., has no non-zero coefficients), video encoder 20 would not signal the dQP to video decoder 30 for this quantization block. A problem arises in such a situation. At video encoder 20, this example quantization block is coded using a non-zero QP using intra or inter prediction. However, without dQP signaling, the inferred QP value at decoder side has a value of zero. This is because dQP is not signaled, and thus dQP inferred to be zero. As such, the current QP for the quantization block would be QP Predictor, as explained above. However, since in this example, QP Predictor is also zero, the current QP value for the quantization block will also be reconstructed to be zero, which video decoder 30 will interpret as indicating that the current quantization block is to be decoded in lossless coding mode. As such, video decoder 30 may try to reconstruct the quantization block using lossless mode, even though it was coded using another prediction mode (e.g., inter or intra prediction). Such a situation leads to encoder/decoder mismatch, which may cause poor visual quality, or even decoder crash.

A second issue arises when the QP Predictor for a current quantization block is non-zero, but the current quantization block is coded with lossless mode and has no residual (i.e., there are no non-zero values in the residual), and thus, dQP is not transmitted. As a result, at video decoder 30, the value of dQP will be inferred to be zero instead of receiving a dQP value equal to −QP Predictor. As such, video decoder 30 will reconstruct an actual QP value of quantization block as 0 (inferred dQP)+QP Predictor=QP Predictor. As such, video decoder 30 will reconstruct a non-zero actual QP value, and thus be unable able to identify lossless mode for this quantization block.

To address the first issue, according to a first example of this disclosure, video encoder 20 is configured to always signal dQP for every quantization block regardless of whether a quantization block is a zero block or not. For example, dQP may always be signaled for a block (e.g., a CU) larger than QG or in the first CU of a QG. In this way, dQP will not incorrectly be inferred to be zero, and would avoid an automatic inference of lossless coding mode for the quantization block when dQP is inferred to be zero and the QP Predictor is also zero.

Figure 4:
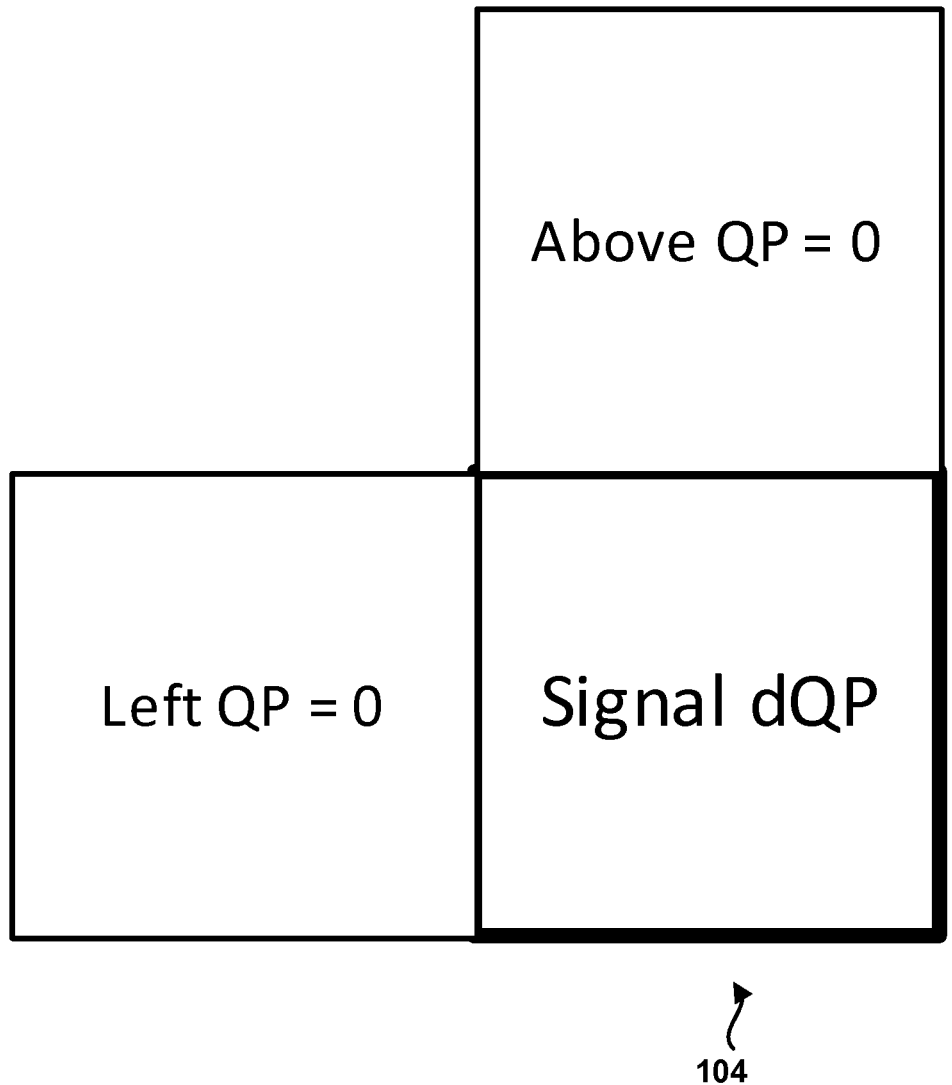
FIG. 4 is a conceptual diagram illustrating an example of delta quantization parameter signaling when a quantization parameter predictor is zero.

According to a second example of the disclosure, in order to limit the number of instances where dQP is signaled, video encoder 20 is configured to signal dQP for a quantization block in the case that the QP Predictor for the quantization block is zero. An example where the QP Predictor for a current quantization block is zero is show in FIG. 4. In the example of FIG. 4, the QP Predictor for block 104 is equal to zero because the QP for both the above block and the left block is zero. Therefore, according to this example of the disclosure, dQP is signaled for quantization block 104 regardless of whether or not it is a zero block. Otherwise, if the QP Predictor is non-zero for quantization block 104, no dQP is signaled for quantization block 104 if it is a zero block.

In another example, regardless of whether or not the current quantization block is a zero block or not, dQP is signaled for the quantization block if one of QPs (e.g., QPs of the above or left quantization block) used for the QP prediction of the current quantization block is equal to zero, or if a difference between the QPs used for the QP prediction is smaller or larger than some threshold, wherein such a threshold can be any integer number. Otherwise, the dQP is not signaled if the quantization block is a zero block. Of course, the dQP is still signaled if the quantization block contains non-zero coefficients. The threshold can be fixed or signaled at a header, for example, at the PPS, slice header, or APS. In other examples, the threshold can be signaled at LCU or CU levels.

In another example of the disclosure, rather than indicating lossless coding mode for a block by using a zero QP, video encoder 20 may be configured to encode a separate flag or syntax element to indicate a block is coded with lossless coding mode. In one example, such flag may be called a "lossless flag." When using lossless flags, all the examples of dQP signaling above are still applicable.

Figure 5:
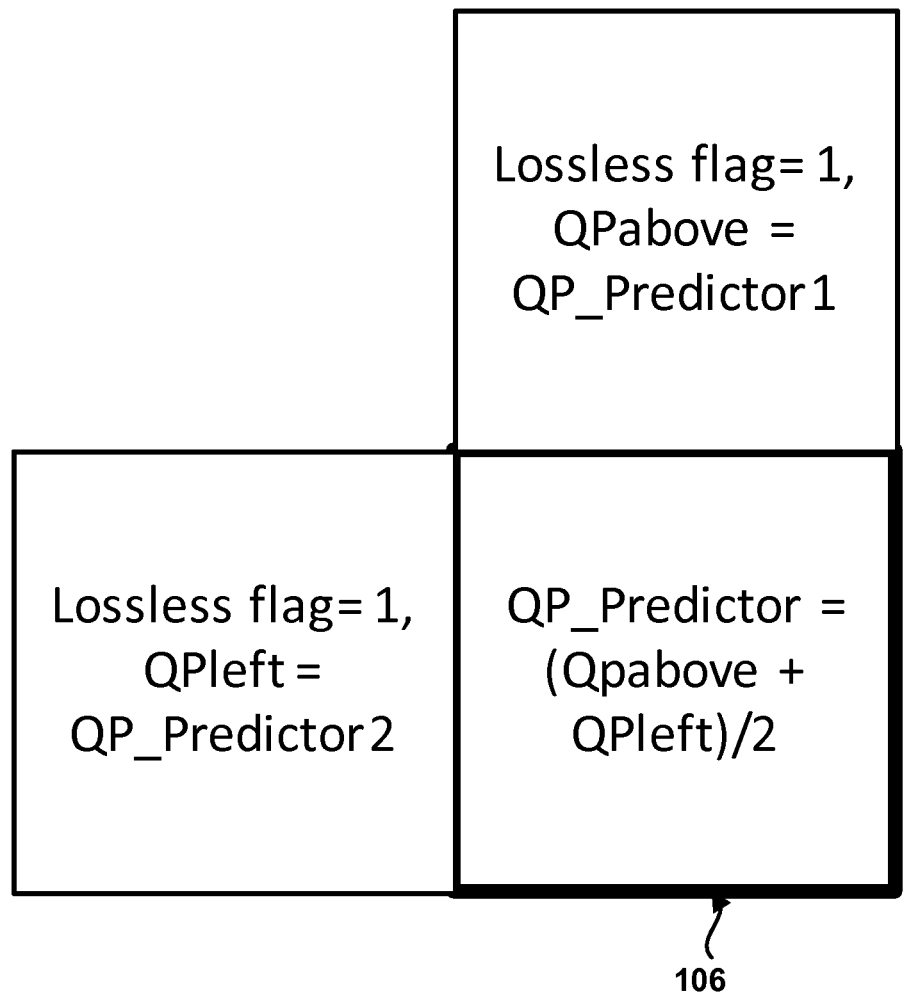
FIG. 5 is a conceptual diagram illustrating an example of delta quantization parameter signaling when a quantization parameter predictor is coded in lossless mode.

For example, in the case that a current quantization block is a zero block, the dQP is signaled for the quantization block if one (or all, in another example) quantization blocks used for QP prediction (e.g., the left and the above quantization blocks in the above examples) is coded in lossless coding mode (i.e., the lossless flag is on for the quantization block used for QP prediction). However, if lossless flag is used to identify the lossless mode coding for a quantization block, setting the QP to zero for that losslessly coded quantization block might not be an optimal option, since this QP value will be used later for predicting QP values of succeeding quantization blocks. One example of losslessly coded left and above quantization blocks with non-zero assigned QP is shown on FIG. 5 (i.e., an example for non-zero QP assigned to lossless coded quantization blocks). As shown in FIG. 5, the left (QPleft) and above (QPabove) quantization blocks relative to current quantization block 106 have non-zero QP, but each are coded in lossless coding mode (indicated with the lossless flag=1).

According to another example of this disclosure, if a quantization block is coded in lossless coding mode as indicated by the lossless flag (e.g., QPleft and QPabove as shown in FIG. 5), a QP value equal to that quantization block's QP Predictor can be set for as current the current QP for that block. For example, for QPabove in FIG. 5, instead of using a QP value of zero for the block since it's losslessly coded, the QP predictor for the QPabove (e.g., the average QPs of the blocks to the left and above QPabove) may be used as the current QP. In this way, a non-zero QP value may available to use as a QP Predictor for succeeding quantization blocks, thus avoiding potential encoder/decoder mismatch. In another example, the QP value of the losslessly coded quantization block, indicated using the lossless flag, can also be set equal to a slice QP or any other predefined QP.

In the description above, a lossless flag was described as being signaled at the quantization block level. As another example of the disclosure, video encoder 20 may be configured to signal the lossless flag per every CU inside the quantization block. In this case, all the techniques described above are still applicable. For example, in case that a CU inside a quantization block is losslessly coded, dQP signaling can be skipped and the value of dQP is inferred o be zero at video decoder 30. As such, a QP Predictor will be derived as the QP for this lossless CU and used to predict QP values of subsequent blocks. In this case, dQP signaling is skipped for a lossless CU regardless of whether there is non-zero residual or not in the CU.

In another example of this disclosure, a quantization block lossless flag can be signaled for a quantization block. When set to, e.g., 1, the quantization block level lossless flag indicates that at least one CU inside a quantization block is losslessly coded. If the quantization block level lossless flag has a value of, e.g., 1, then a CU lossless flag is signaled for every CU inside the quantization block indicating whether or not the particular CU is losslessly coded. Otherwise, if the quantization block lossless flag is 0 (i.e., no losslessly coded CUs in the quantization block), no CU lossless flag is needed for every CU inside the quantization block.

In another example, signaling efficiency can be further improved when using two level (quantization block based and CU based) lossless flags. If the quantization block level lossless flag is enabled (e.g., has a value of 1) and the last CU is reached and there are no CU level lossless flags coded prior to the last CU for the current quantization block, then the signaling of the CU lossless flag for the last CU can be skipped. This is because the lossless flag of the quantization block indicates that there is at least one lossless coded CU, and therefore, it can be inferred that the last CU in this example must be losslessly coded. However, if a lossless flag for quantization group is disabled (e.g., has a value of 0), meaning there are no CUs lossless coded inside the quantization block, then CU based lossless flag signaling can be omitted for the current quantization block.

The same techniques for coding a lossless flag and signaling redundancy removal, in the case when a lossless flag can be inferred as described above, can be applied at the frame, slice, LCU and/or other defined unit or levels of the video coding process. The term "flag" may refer to a single-bit syntax element. In addition, rather than a flag, a multi-bit syntax element, a variable length syntax element, or other type of data structure capable of conveying the information described above for a flag may also be used.

To reiterate the second drawback related to currently proposed dQP signaling techniques in HEVC, video decoder 30 may be unable to correctly identify lossless coding mode for a quantization block when the QP Predictor for a current quantization block is non-zero, but the current quantization block may be coded with lossless mode and have no residual (i.e., there are no non-zero values in the residual). In this situation, dQP is not transmitted, and inferred to be zero by video decoder 30. As such, video decoder 30 will reconstruct a non-zero actual QP value using the zero dQP, and thus be unable to identify lossless mode for this quantization block.

To solve this problem, according to another example of this disclosure, video encoder 20 may be configured to eliminate scenarios where it would otherwise be unable able to identify lossless mode, so that video encoder 20 is simply not allowed to choose the lossless coding mode for a particular quantization block when there is no prediction residual for the current quantization block and the QP Predictor is not zero or quantization blocks used for QP prediction are losslessly coded (e.g., the lossless flag is on). As such, the situation where video decoder 30 determines a non-zero QP for a quantization block that was losslessly can be avoided.

Another drawback to some proposals for dQP signaling in HEVC involves the unary binarization coding used. In such proposals for HEVC, dQP is coded using truncated unary binarization. A dQP value can range from $-(26+QpBdOffset_Y/2)$ to $+(25+QpBdOffset_Y/2)$, where $QpBdOffset_Y$ depends on bit depth input, which can be from 0 to 18. Due to the asymmetric distribution of delta QP values, cMax of truncated unary binarization depends on the sign of dQP value. For example assuming $QpBdOffset_Y$ equal to zero, cMax is equal to 26 if the value is negative, and cMax equals to 25 for positive values. As a result, this requires video encoder 20 and video decoder 30 to check the sign in dQP coding and parsing. Depending on the sign value, a different cMax value is used in coding and parsing the dQP value.

To reduce this complexity, this disclosure further proposes to remove sign dependency in dQP binarization by changing the range of the dQP value so that the cMax value in truncated unary binarization is the same regardless of the sign. For example, for a positive dQP value, the range can be increased by one and the whole range will be from $-(26+QpBdOffset_Y/2)$ to $+(26+QpBdOffset_Y/2)$. In this case, the same binarization is used for coding or parsing both positive and negative dQP values, and no check of the sign value is needed. This technique is not limited only to truncated unary binarization, but can be applied to any other binarization scheme, for example Exponential-Golomb coding methods.

Figure 6:
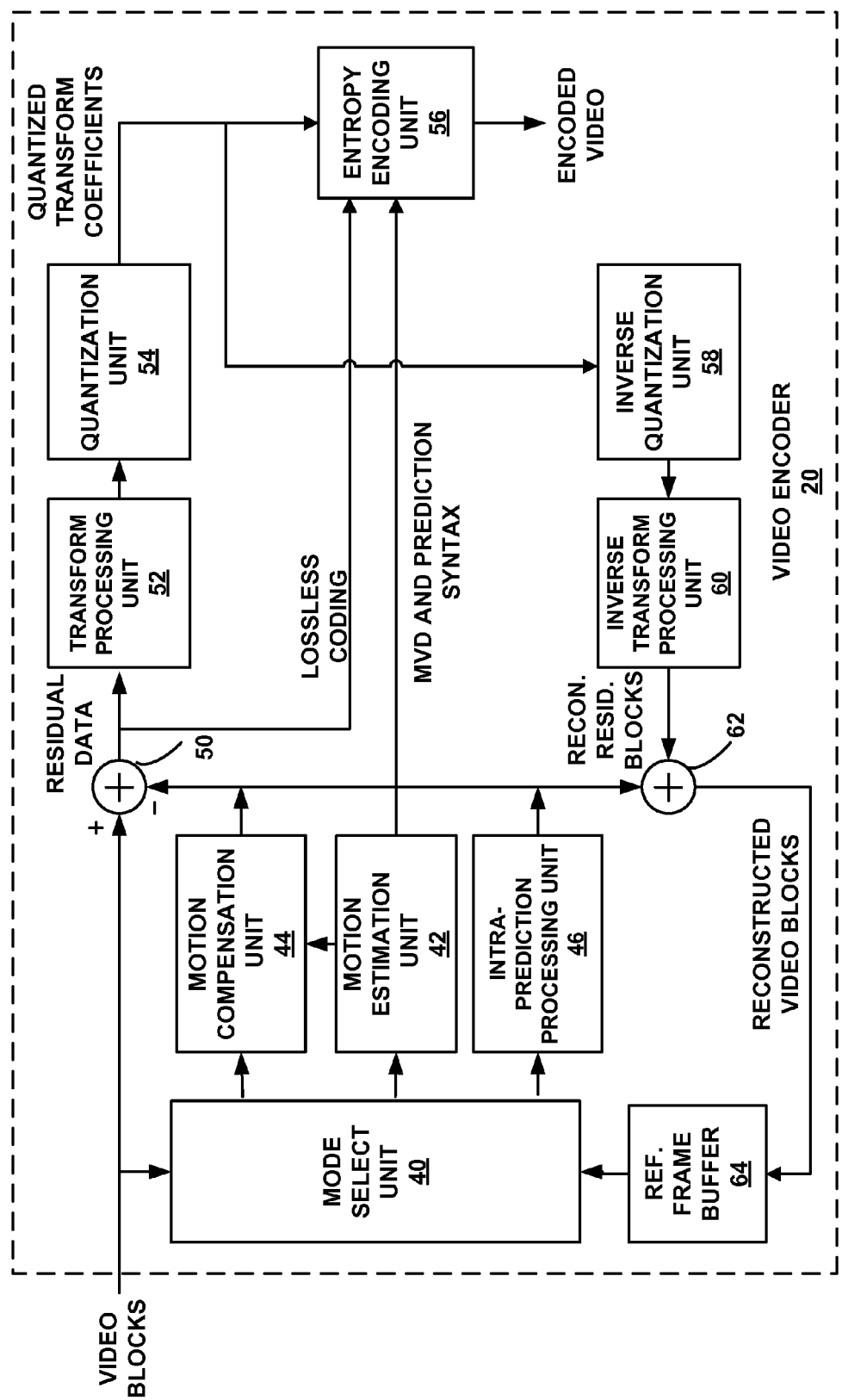
FIG. 6 is a block diagram illustrating an example video encoder.

FIG. 6 is a block diagram illustrating an example of a video encoder 20 that may use techniques for dQP coding as described in this disclosure. The video encoder 20 will be described in the context of HEVC coding for purposes of illustration, but without limitation of this disclosure as to other coding standards or methods that may require scanning of transform coefficients. The video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 6, the video encoder 20 receives a current video block within a video frame to be encoded. In the example of FIG. 6, the video encoder 20 includes a motion compensation unit 44, a motion estimation unit 42, an intra-prediction processing unit 46, a reference frame buffer 64, a summer 50, a transform processing unit 52, a quantization unit 54, and an entropy encoding unit 56. The transform processing unit 52 illustrated in FIG. 6 is the unit that applies the actual transform or combinations of transform to a block of residual data, and is not to be confused with a block of transform coefficients, which also may be referred to as a transform unit (TU) of a CU. For video block reconstruction, the video encoder 20 also includes an inverse quantization unit 58, an inverse transform processing unit 60, and a summer 62. A deblocking filter (not shown in FIG. 6) may also be included to filter block boundaries to remove blockiness artifacts from reconstructed video. If desired, the deblocking filter would typically filter the output of the summer 62.

During the encoding process, the video encoder 20 receives a video frame or slice to be coded. The frame or slice may be divided into multiple video blocks, e.g., largest coding units (LCUs). The motion estimation unit 42 and the motion compensation unit 44 perform inter-predictive coding of the received video block relative to one or more blocks in one or more reference frames to provide temporal compression. The intra-prediction processing unit 46 may perform intra-predictive coding of the received video block relative to one or more neighboring blocks in the same frame or slice as the block to be coded to provide spatial compression.

The mode select unit 40 may select one of the coding modes, intra or inter, e.g., based on error (i.e., distortion) results for each mode, and provides the resulting intra- or inter-predicted block (e.g., a prediction unit (PU)) to the summer 50 to generate residual block data and to the summer 62 to reconstruct the encoded block for use in a reference frame. Summer 62 combines the predicted block with inverse quantized, inverse transformed data from inverse transform processing unit 60 for the block to reconstruct the encoded block, as described in greater detail below. Some video frames may be designated as I-frames, where all blocks in an I-frame are encoded in an intra-prediction mode. In some cases, the intra-prediction processing unit 46 may perform intra-prediction encoding of a block in a P- or B-frame, e.g., when the motion search performed by the motion estimation unit 42 does not result in a sufficient prediction of the block.

The motion estimation unit 42 and the motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. The motion estimation unit 42 calculates a motion vector for a prediction unit of an inter-coded frame by comparing the prediction unit to reference samples of a reference frame stored in the reference frame buffer 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position.

The motion estimation unit 42 sends the calculated motion vector to the entropy encoding unit 56 and the motion compensation unit 44. The portion of the reference frame identified by a motion vector may be referred to as a reference sample. The motion compensation unit 44 may calculate a prediction value for a prediction unit of a current CU, e.g., by retrieving the reference sample identified by a motion vector for the PU.

The intra-prediction processing unit 46 may intra-predict the received block, as an alternative to inter-prediction performed by the motion estimation unit 42 and the motion compensation unit 44. The intra-prediction processing unit 46 may predict the received block relative to neighboring, previously coded blocks, e.g., blocks above, above and to the right, above and to the left, or to the left of the current block, assuming a left-to-right, top-to-bottom encoding order for blocks. The intra-prediction processing unit 46 may be configured with a variety of different intra-prediction modes. For example, the intra-prediction processing unit 46 may be configured with a certain number of directional prediction modes, e.g., thirty-three directional prediction modes, based on the size of the CU being encoded.

The intra-prediction processing unit 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, the intra-prediction processing unit 46 may calculate an error value for the prediction mode based on pixel differences between the PU and the received block to be encoded. The intra-prediction processing unit 46 may continue testing intra-prediction modes until an intra-prediction mode that yields an acceptable error value is discovered. The intra-prediction processing unit 46 may then send the PU to the summer 50.

The video encoder 20 forms a residual block by subtracting the prediction data calculated by the motion compensation unit 44 or the intra-prediction processing unit 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

In some instances, for example, in a lossless coding mode, the residual may be sent directly to entropy encoding unit 56. As such, transform and quantization processes are skipped. In addition, any loop filter processes may also be skipped.

The transform processing unit 52 may form one or more transform units (TUs) from the residual block. The transform processing unit 52 selects a transform from among a plurality of transforms. The transform may be selected based on one or more coding characteristics, such as block size, coding mode, or the like. The transform processing unit 52 then applies the selected transform to the TU, producing a video block comprising a two-dimensional array of transform coefficients.

The transform processing unit 52 may send the resulting transform coefficients to the quantization unit 54. The quantization unit 54 may then quantize the transform coefficients. The entropy encoding unit 56 may then perform a scan of the quantized transform coefficients in the matrix according to a scanning mode. This disclosure describes the entropy encoding unit 56 as performing the scan. However, it should be understood that, in other examples, other processing units, such as the quantization unit 54, could perform the scan. Quantization unit 56 may be configured to code dQP values in accordance with the techniques described above. Additional description of the function of quantization unit 56 in this regard will be discussed below with reference to FIG. 8.

Once the transform coefficients are scanned into the one-dimensional array, the entropy encoding unit 56 may apply entropy coding such as CABAC, syntax-based context-adaptive binary arithmetic coding (SBAC), Probability Interval Partitioning Entropy (PIPE), or another entropy coding methodology to the coefficients.

To perform CABAC, the entropy encoding unit 56 may select a context model to apply to a certain context to encode symbols to be transmitted. The context may relate to, for example, whether neighboring values are non-zero or not. The entropy encoding unit 56 may also entropy encode syntax elements, such as the signal representative of the selected transform. In accordance with the techniques of this disclosure, the entropy encoding unit 56 may select the context model used to encode these syntax elements based on, for example, an intra-prediction direction for intra-prediction modes, a scan position of the coefficient corresponding to the syntax elements, block type, and/or transform type, among other factors used for context model selection.

Following the entropy coding by the entropy encoding unit 56, the resulting encoded video may be transmitted to another device, such as the video decoder 30, or archived for later transmission or retrieval.

In some cases, the entropy encoding unit 56 or another unit of the video encoder 20 may be configured to perform other coding functions, in addition to entropy coding. For example, the entropy encoding unit 56 may be configured to determine coded block pattern (CBP) values for CU's and PU's. Also, in some cases, the entropy encoding unit 56 may perform run length coding of coefficients.

The inverse quantization unit 58 and the inverse transform processing unit 60 apply inverse quantization and inverse transformation, respectively, to reconstruct the residual block in the pixel domain, e.g., for later use as a reference block. The motion compensation unit 44 may calculate a reference block by adding the residual block to a predictive block of one of the frames of the reference frame buffer 64. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reconstructed video block for storage in the reference frame buffer 64. The reconstructed video block may be used by the motion estimation unit 42 and the motion compensation unit 44 as a reference block to inter-code a block in a subsequent video frame.

Figure 7:
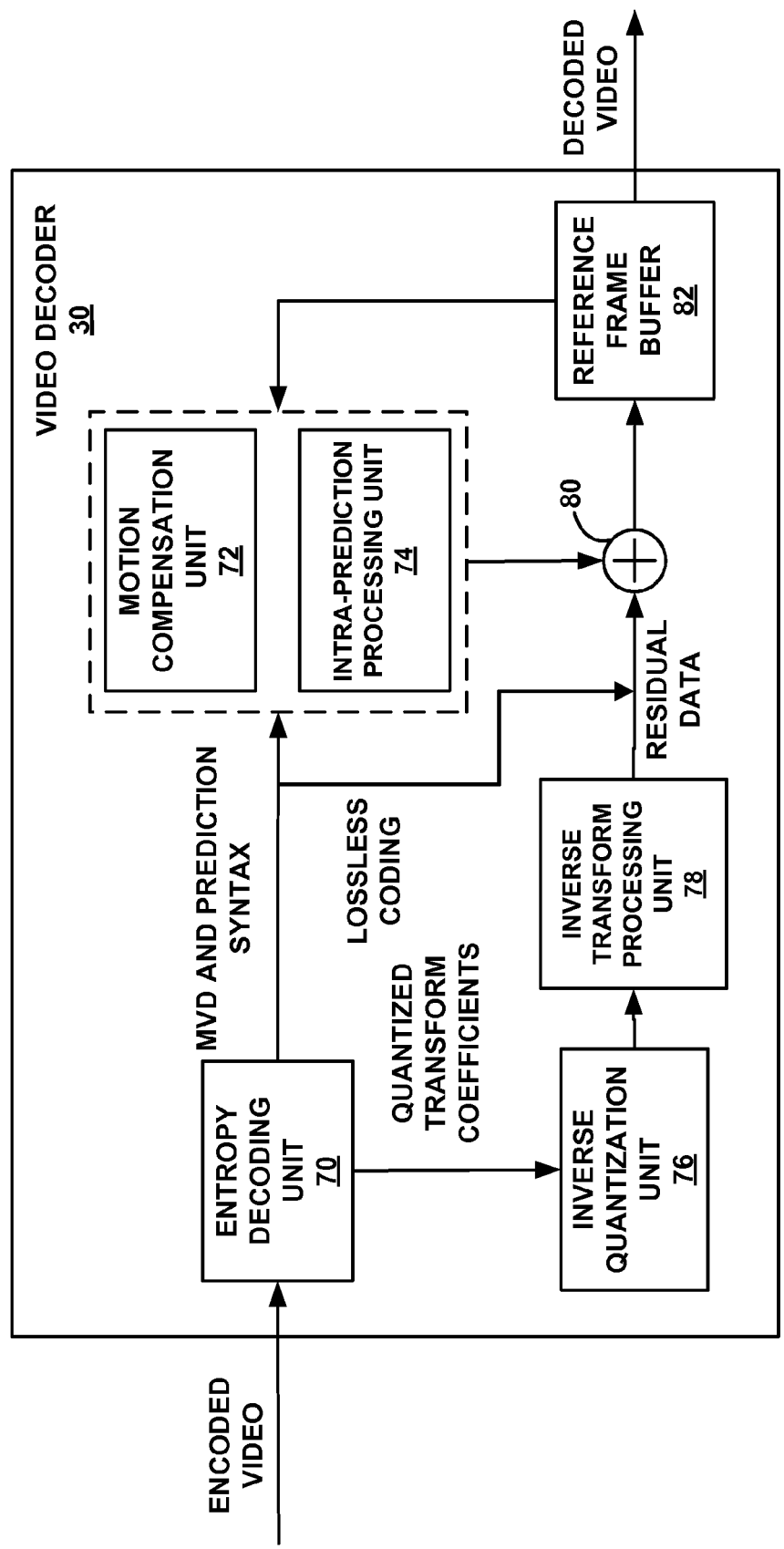
FIG. 7 is a block diagram illustrating an example video decoder.

FIG. 7 is a block diagram illustrating an example of a video decoder 30, which decodes an encoded video sequence. In the example of FIG. 7, the video decoder 30 includes an entropy decoding unit 70, a motion compensation unit 72, an intra-prediction processing unit 74, an inverse quantization unit 76, an inverse transformation unit 78, a reference frame buffer 82 and a summer 80. The video decoder 30 may, in some examples, perform a decoding pass generally reciprocal to the encoding pass described with respect to the video encoder 20 (see FIG. 6).

The entropy decoding unit 70 performs an entropy decoding process on the encoded bitstream to retrieve a one-dimensional array of transform coefficients. The entropy decoding process used depends on the entropy coding used by the video encoder 20 (e.g., CABAC). The entropy coding process used by the encoder may be signaled in the encoded bitstream or may be a predetermined process.

In some instances, for example, in a lossless coding mode, the output (i.e., a residual in this example) may be sent directly from entropy decoding unit 70 to summer 80. As such, inverse transform and quantization processes are skipped. In addition, any loop filter processes may also be skipped.

In some examples, the entropy decoding unit 70 (or the inverse quantization unit 76) may scan the received values using a scan mirroring the scanning mode used by the entropy encoding unit 56 (or the quantization unit 54) of the video encoder 20. Although the scanning of coefficients may be performed in the inverse quantization unit 76, scanning will be described for purposes of illustration as being performed by the entropy decoding unit 70. In addition, although shown as separate functional units for ease of illustration, the structure and functionality of the entropy decoding unit 70, the inverse quantization unit 76, and other units of the video decoder 30 may be highly integrated with one another.

The inverse quantization unit 76 inverse quantizes, i.e., de-quantizes, the quantized transform coefficients provided in the bitstream and decoded by the entropy decoding unit 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. The inverse quantization unit 76 may inverse quantize the transform coefficients either before or after the coefficients are converted from a one-dimensional array to a two-dimensional array. Inverse quantization unit 76 may be configured to decode dQP values in accordance with the techniques described above. Additional description of the function of inverse quantization unit 76 in this regard will be discussed below with reference to FIG. 9.

The inverse transform processing unit 78 applies an inverse transform to the inverse quantized transform coefficients. In some examples, the inverse transform processing unit 78 may determine an inverse transform based on signaling from the video encoder 20, or by inferring the transform from one or more coding characteristics such as block size, coding mode, or the like. In some examples, the inverse transform processing unit 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, the inverse transform processing unit 78 may apply a cascaded inverse transform, in which inverse transform processing unit 78 applies two or more inverse transforms to the transform coefficients of the current block being decoded.

The intra-prediction processing unit 74 may generate prediction data for a current block of a current frame based on a signaled intra-prediction mode and data from previously decoded blocks of the current frame.

The motion compensation unit 72 may retrieve the motion vector, motion prediction direction and reference index from the encoded bitstream. The reference prediction direction indicates whether the inter-prediction mode is uni-directional (e.g., a P frame) or bi-directional (a B frame). The reference index indicates which reference frame the candidate motion vector is based on.

Based on the retrieved motion prediction direction, reference frame index, and motion vector, the motion compensation unit produces a motion compensated block for the current portion. These motion compensated blocks essentially recreate the predictive block used to produce the residual data.

The motion compensation unit 72 may produce the motion compensated blocks, possibly performing interpolation based on interpolation filters. Identifiers for interpolation filters to be used for motion estimation with sub-pixel precision may be included in the syntax elements. The motion compensation unit 72 may use interpolation filters as used by the video encoder 20 during encoding of the video block to calculate interpolated values for sub-integer pixels of a reference block. The motion compensation unit 72 may determine the interpolation filters used by the video encoder 20 according to received syntax information and use the interpolation filters to produce predictive blocks.

Additionally, the motion compensation unit 72 and the intra-prediction processing unit 74, in an HEVC example, may use some of the syntax information (e.g., provided by a quadtree) to determine sizes of LCUs used to encode frame(s) of the encoded video sequence. The motion compensation unit 72 and the intra-prediction processing unit 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

The summer 80 combines the residual blocks with the corresponding prediction blocks generated by the motion compensation unit 72 or the intra-prediction processing unit 74 to form decoded blocks. If desired, a deblocking filter may also be applied to filter the decoded blocks in order to remove blockiness artifacts. The decoded video blocks are then stored in the reference frame buffer 82 (also referred to as a decoded picture buffer), which provides reference blocks for subsequent motion compensation and also produces decoded video for presentation on a display device (such as the display device 32 of FIG. 1).

Figure 8:
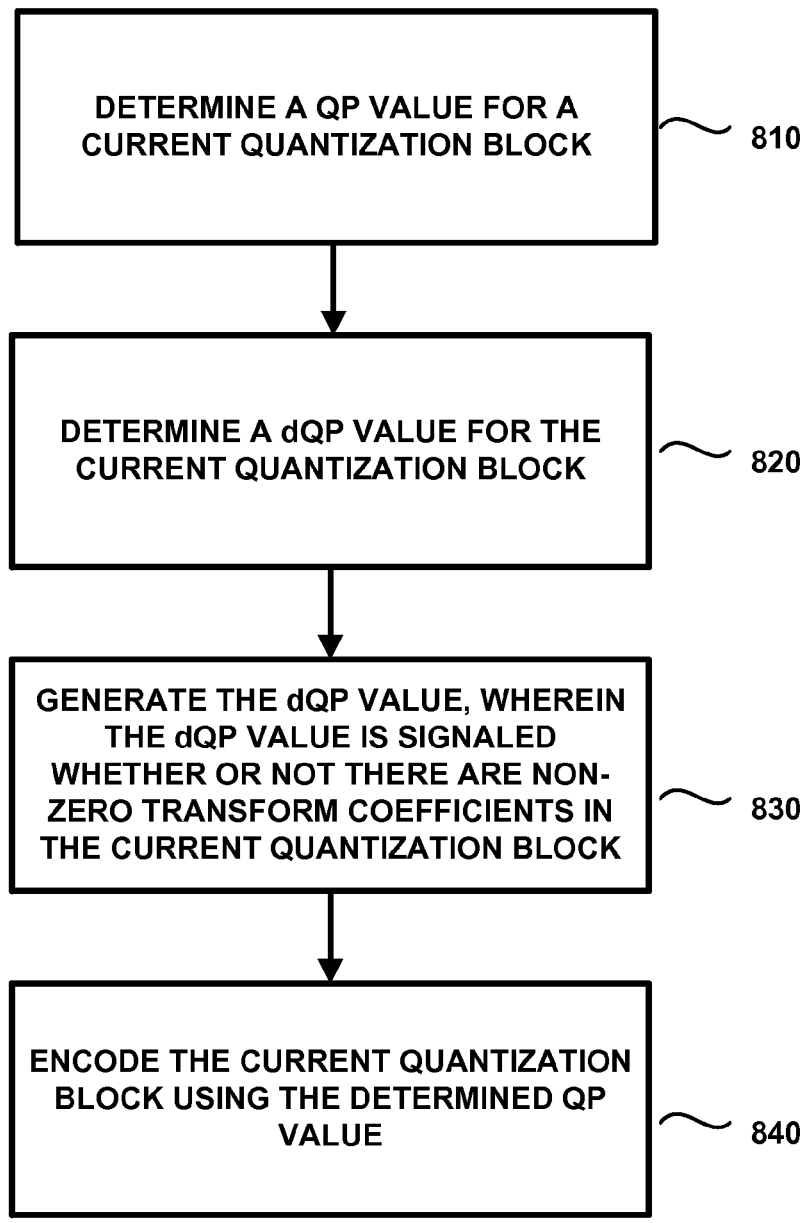
FIG. 8 is a flowchart showing an example video encoding method according to the techniques of this disclosure.

FIG. 8 is a flowchart showing an example video encoding method according to the techniques of this disclosure. The techniques of FIG. 8 may be carried out by one more hardware units of video encoder 20, including quantization unit 56.

In one example of the disclosure, quantization unit 56 may be configured to determine a quantization parameter (QP) value for a current quantization block (810), determine a delta quantization parameter (dQP) value for the current quantization block of video data based on the QP and a QP predictor (820), and generate the dQP value, wherein the dQP value is signaled whether or not there are non-zero transform coefficients in the current quantization block (830). In various examples of the disclosure, the QP Predictor is an average of a QP value for an above quantization block and a left quantization block, wherein the above quantization block is located above the current quantization block and wherein the left quantization block is located to the left of the current quantization block. Video encoder 20 may be further configured to encode the current quantization block using the determined QP value (840).

In one example of the disclosure, video encoder 20 may be further configured to generate a quantization group (QG) size, wherein the current quantization block comprises one or more coding units (CUs) having a size equal to or less than the QG size or a CU having a size greater than the QG size.

In another example of the disclosure, quantization unit 56 may be configured to generate the dQP value for the current quantization block of video data only in the case that the QP Predictor for the current quantization block has a value of zero, and infer the dQP value to be zero in the case that the QP Predictor the for the current quantization block has a non-zero value, and there are no non-zero transform coefficients in the current quantization block.

In another example of the disclosure, quantization unit 56 may be configured to generate the dQP value for the current quantization block of video data only in the case that one QP value used to determine the QP Predictor for the current quantization block has a value of zero, and infer the dQP value to be zero in the case that the QP Predictor the for the current quantization block has a non-zero value, and there are no non-zero transform coefficients in the current quantization block.

In another example of the disclosure, quantization unit 56 may be configured to generate the dQP value for the current quantization block of video data only in the case that the difference between two QP values used to determine the QP Predictor is greater than a threshold, and infer the dQP value to be zero in the case that the QP Predictor the for the current quantization block has a non-zero value, and there are no non-zero transform coefficients in the current quantization block.

In another example of the disclosure, quantization unit 56 may be configured to generate the dQP value for the current quantization block of video data only in the case that the difference between two QP values used to determine the QP Predictor is less than a threshold, and infer the dQP value to be zero in the case that the QP Predictor the for the current quantization block has a non-zero value, and there are no non-zero transform coefficients in the current quantization block.

In another example of the disclosure, quantization unit 56 may be configured to generate any of the thresholds described above in one or more of a picture parameter set (PPS), adaptation parameter set (APS), slice header, largest coding unit (LCU) header, and CU header.

In another example of the disclosure, video encoder 20 may be configured to generate a lossless flag indicating that the current quantization block was encoded using a lossless coding mode, and encode the current quantization block using according to the lossless coding mode.

In another example of the disclosure, quantization unit 56 may be configured to assign a QP value for the current quantization block to be equal to a QP Predictor in the case that the lossless flag is received for the current quantization block, wherein the QP value is used for subsequent QP prediction.

In another example of the disclosure, video encoder 20 may be configured to, in the case that the current quantization block includes two or more CUs, generate a lossless flag at each of the two or more CUs in the case that a lossless flag received at the current quantization block indicates that one or more CUs in the quantization blocks were encoded using the lossless coding mode.

In another example of the disclosure, video encoder 20 may be configured to encode the dQP value using a truncated unary binarization technique without checking a sign of the dQP value.

In another example of the disclosure, video encoder 20 may be configured to not select a lossless coding mode for the current quantization in the case that the current quantization block has no prediction residual and QP Predictor for the current quantization block is non-zero.

In another example of the disclosure, video encoder 20 may be configured to not select a lossless coding mode for the current quantization in the case that the current quantization block has no prediction residual and one or more quantization blocks used to determine a QP Predictor for the current quantization block are coded in a lossless coding mode.

Figure 9:
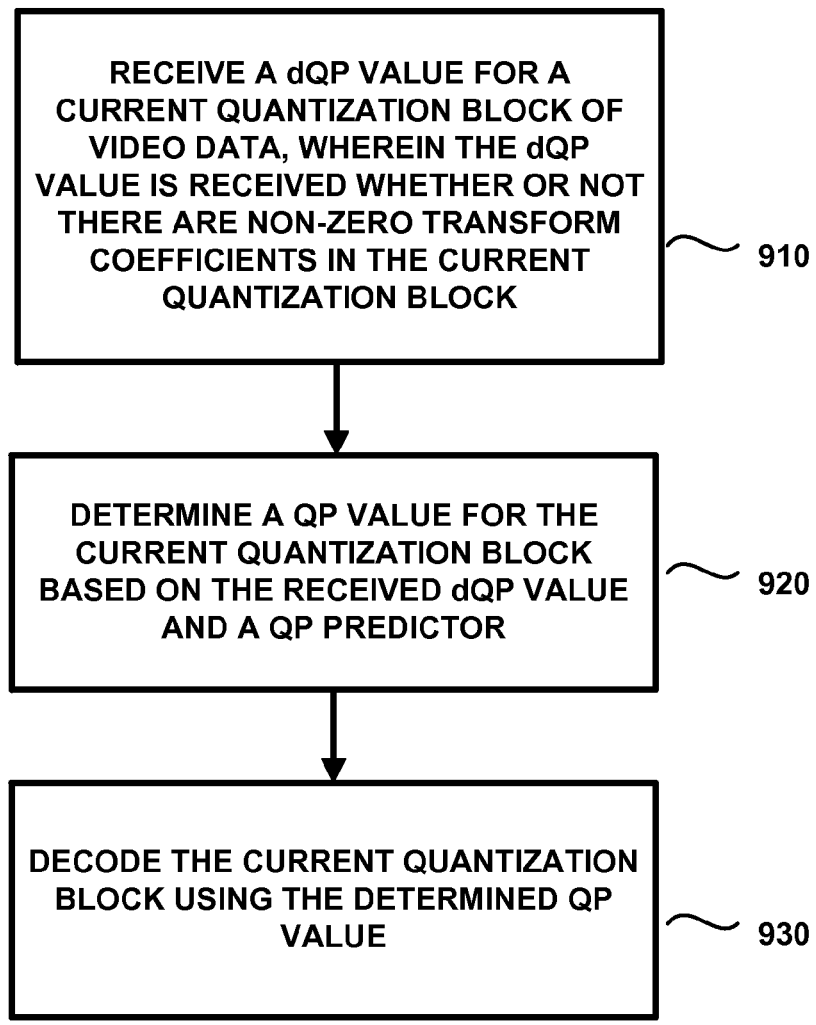
FIG. 9 is a flowchart showing an example video decoding method according to the techniques of this disclosure.

FIG. 9 is a flowchart showing an example video decoding method according to the techniques of this disclosure. The techniques of FIG. 9 may be carried out by one more hardware units of video decoder 30, including inverse quantization unit 76.

In one example of the disclosure, inverse quantization unit 76 may be configured to receive a delta quantization parameter (dQP) value for a current quantization block of video data, wherein the dQP value is received whether or not there are non-zero transform coefficients in the current quantization block (910), and determine a quantization parameter (QP) value for the current quantization block based on the received dQP value and a QP Predictor (920). In various examples of the disclosure, the QP Predictor is an average of a QP value for an above quantization block and a left quantization block, wherein the above quantization block is located above the current quantization block and wherein the left quantization block is located to the left of the current quantization block. Video decoder 30 may be further configured to decode the current quantization block using the determined QP value (930).

In another example of the disclosure, inverse quantization unit 76 may be further configured to receive a quantization group (QG) size, wherein the current quantization block comprises one or more coding units (CUs) having a size equal to or less than the QG size or a CU having a size greater than the QG size.

In another example of the disclosure, inverse quantization unit 76 may be further configured to receive the dQP value for the current quantization block of video data only in the case that the QP Predictor for the current quantization block has a value of zero, and infer the dQP value to be zero in the case that the QP Predictor the for the current quantization block has a non-zero value, and there are no non-zero transform coefficients in the current quantization block.

In another example of the disclosure, inverse quantization unit 76 may be further configured to receive the dQP value for the current quantization block of video data only in the case that one QP value used to determine the QP Predictor for the current quantization block has a value of zero, and infer the dQP value to be zero in the case that the QP Predictor the for the current quantization block has a non-zero value, and there are no non-zero transform coefficients in the current quantization block.

In another example of the disclosure, inverse quantization unit 76 may be further configured to receive the dQP value for the current quantization block of video data only in the case that the difference between two QP values used to determine the QP Predictor is greater than a threshold, and infer the dQP value to be zero in the case that the QP Predictor the for the current quantization block has a non-zero value, and there are no non-zero transform coefficients in the current quantization block.

In another example of the disclosure, inverse quantization unit 76 may be further configured to receive the dQP value for the current quantization block of video data only in the case that the difference between two QP values used to determine the QP Predictor is less than a threshold, and infer the dQP value to be zero in the case that the QP Predictor the for the current quantization block has a non-zero value, and there are no non-zero transform coefficients in the current quantization block.

In another example of the disclosure, inverse quantization unit 76 may be further configured to receive any of the above-described thresholds in one or more of a picture parameter set (PPS), adaptation parameter set (APS), slice header, largest coding unit (LCU) header, and CU header.

In another example of the disclosure, video decoder 30 may be further configured to receive a lossless flag indicating that the current quantization block was encoded using a lossless coding mode, and decode the current quantization block using according to the lossless coding mode.

In another example of the disclosure, inverse quantization unit 76 may be further configured to assign a QP value for the current quantization block to be equal to a QP Predictor in the case that the lossless flag is received for the current quantization block, wherein the QP value is used for subsequent QP prediction.

In another example of the disclosure, video decoder 30 may be further configured to receive a lossless flag at each of the two or more CUs in the case that a lossless flag received at the current quantization block indicates that one or more CUs in the quantization blocks were encoded using the lossless coding mode.

In another example of the disclosure, video decoder 30 may be further configured to decode the dQP value using a truncated unary binarization technique without checking a sign of the dQP value.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    receiving a lossless coding syntax element for a current block of video data, the lossless coding syntax element indicating that the current block of video data is encoded using a lossless coding mode, the lossless coding syntax element being separate from a quantization parameter (QP) value;
    determining that the current block of video data is a current quantization block based on a size of the current block of video data;
    assigning a delta quantization parameter (dQP) value of zero for the current quantization block, wherein the dQP value is a difference between the QP value and a value of a QP Predictor;
    determining the QP value for the current quantization block based on the assigned dQP value and the QP Predictor; and
    decoding the current quantization block according to the lossless coding mode and the determined QP value.

2. The method of claim 1, wherein the current block of video data is a coding unit (CU) of video data, the method further comprising:
    determining a quantization group (QG) size; and
    determining that the CU has the size greater than or equal to the QG size.

3. The method of claim 1, the method further comprising:
    determining the QP value by adding the assigned dQP value to a value of the QP Predictor, wherein the QP Predictor is an average of a QP value for an above quantization block and a left quantization block, wherein the above quantization block is located above the current quantization block and wherein the left quantization block is located to the left of the current quantization block.

4. The method of claim 1, further comprising:
    performing QP prediction for another block of video data using the determined QP value.

5. A method of encoding video data, the method comprising:
    determining that a current block of video data is to be encoded using a lossless coding mode;
    determining that the current block of video data is a current quantization block based on a size of the current block of video data;
    determining a quantization parameter (QP) value for the current quantization block of video data based on a zero value for a delta quantization parameter (dQP) for the current quantization block and a value of a QP predictor, wherein the dQP value is a difference between the QP value and the value of the QP Predictor;
    generating a lossless coding syntax element for the current block of video data, the lossless coding syntax element indicating that the current block of video data is encoded using a lossless coding mode, the lossless coding syntax element being separate from the QP value; and
    encoding the current quantization block according to the lossless coding mode and the determined QP value.

6. The method of claim 5, wherein the current block of video data is a coding unit (CU) of video data, the method further comprising:

determining a quantization group (QG) size; and
determining that the CU has the size greater than or equal to the QG size.

7. The method of claim 5, the method further comprising:
determining the QP value by adding the assigned dQP value to a value of the QP Predictor, wherein the QP Predictor is an average of a QP value for an above quantization block and a left quantization block, wherein the above quantization block is located above the current quantization block and wherein the left quantization block is located to the left of the current quantization block.

8. The method of claim 5, further comprising:
performing QP prediction for another block of video data using the determined QP value.

9. An apparatus configured to decode video data, the apparatus comprising:
a memory configured to store the video data; and
a video decoder configured to:
receive a lossless coding syntax element for a current block of the video data, the lossless coding syntax element indicating that the current block of the video data is encoded using a lossless coding mode, the lossless coding syntax element being separate from a quantization parameter (QP) value;
determine that the current block of the video data is a current quantization block based on a size of the current block of the video data;
assign a delta quantization parameter (dQP) value of zero for the current quantization block, wherein the dQP value is a difference between the QP value and a value of a QP Predictor;
determine the QP value for the current quantization block based on the assigned dQP value and a QP Predictor; and
decode the current quantization block according to the lossless coding mode and the determined QP value.

10. The apparatus of claim 9, wherein the current block of the video data is a coding unit (CU) of the video data, and wherein the video decoder is further configured to:
determine a quantization group (QG) size; and
determine that the CU has the size greater than or equal to the QG size.

11. The apparatus of claim 9, wherein the vide decoder is further configured to:
determine the QP value by adding the assigned dQP value to a value of the QP Predictor, wherein the QP Predictor is an average of a QP value for an above quantization block and a left quantization block, wherein the above quantization block is located above the current quantization block and wherein the left quantization block is located to the left of the current quantization block.

12. The apparatus of claim 9, wherein the video decoder is further configured to:
perform QP prediction for another block of video data using the determined QP value.

13. An apparatus configured to encode video data, the apparatus comprising:
a memory configured to store the video data; and
a video encoder configured to:
determine that a current block of the video data is to be encoded using a lossless coding mode;
determine that the current block of the video data is a current quantization block based on a size of the current block of the video data;
determine a quantization parameter (QP) value for the current quantization block of the video data based on a zero value for a delta quantization parameter (dQP) for the current quantization block and a value of a QP predictor, wherein the dQP value is a difference between the QP value and the value of the QP Predictor;
generate a lossless coding syntax element for the current block of the video data, the lossless coding syntax element indicating that the current block of the video data is encoded using a lossless coding mode, the lossless coding syntax element being separate from the QP value; and
encode the current quantization block according to the lossless coding mode and the determined QP value.

14. The apparatus of claim 13, wherein the current block of video data is a coding unit (CU) of the video data, and wherein the video encoder is further configured to:
determine a quantization group (QG) size; and
determine that the CU has the size greater than or equal to the QG size.

15. The apparatus of claim 13, wherein the video encoder is further configured to:
determine the QP value by adding the assigned dQP value to a value of the QP Predictor, wherein the QP Predictor is an average of a QP value for an above quantization block and a left quantization block, wherein the above quantization block is located above the current quantization block and wherein the left quantization block is located to the left of the current quantization block.

16. The apparatus of claim 13, wherein the video encoder is further configured to:
perform QP prediction for another block of video data using the determined QP value.

17. An apparatus configured to decode video data, the apparatus comprising:
means for receiving a lossless coding syntax element for a current block of video data, the lossless coding syntax element indicating that the current block of video data is encoded using a lossless coding mode, the lossless coding syntax element being separate from a quantization parameter (QP) value;
means for determining that the current block of video data is a current quantization block based on a size of the current block of video data;
means for assigning a delta quantization parameter (dQP) value of zero for the current quantization block, wherein the dQP value is a difference between the QP value and a value of a QP Predictor;
means for determining the QP value for the current quantization block based on the assigned dQP value and a QP Predictor; and
means for decoding the current quantization block according to the lossless coding mode and the determined QP value.

18. An apparatus configured to encode video data, the apparatus comprising:
means for determining that a current block of video data is to be encoded using a lossless coding mode;
means for determining that the current block of video data is a current quantization block based on a size of the current block of video data;
means for determining a quantization parameter (QP) value for the current quantization block of video data based on a zero value for a delta quantization parameter (dQP) for the current quantization block and a value of a QP predictor, wherein the dQP value is a difference between the QP value and the value of the QP Predictor;

means for generating a lossless coding syntax element for the current block of video data, the lossless coding syntax element indicating that the current block of video data is encoded using a lossless coding mode, the lossless coding syntax element being separate from the QP value; and means for encoding the current quantization block according to the lossless coding mode and the determined QP value.

19. A non-transitory computer-readable storage medium storing instructions that, when executed, cause one or more processors of a device configured to decode video data to:

receive a lossless coding syntax element for a current block of video data, the lossless coding syntax element indicating that the current block of video data is encoded using a lossless coding mode, the lossless coding syntax element being separate from a quantization parameter (QP) value;

determine that the current block of video data is a current quantization block based on a size of the current block of video data;

assign a delta quantization parameter (dQP) value of zero for the current quantization block, wherein the dQP value is a difference between the QP value and a value of a QP Predictor;

determine the QP value for the current quantization block based on the assigned dQP value and a QP Predictor; and decode the current quantization block according to the lossless coding mode and the determined QP value.

20. A non-transitory computer-readable storage medium storing instructions that, when executed, cause one or more processors of a device configured to encode video data to:

determine that a current block of video data is to be encoded using a lossless coding mode;

determine that the current block of video data is a current quantization block based on a size of the current block of video data;

determine a quantization parameter (QP) value for the current quantization block of video data based on a zero value for a delta quantization parameter (dQP) for the current quantization block and a value of a QP predictor, wherein the dQP value is a difference between the QP value and the value of the QP Predictor;

generate a lossless coding syntax element for the current block of video data, the lossless coding syntax element indicating that the current block of video data is encoded using a lossless coding mode, the lossless coding syntax element being separate from the QP value; and encode the current quantization block according to the lossless coding mode and the determined QP value.

* * * * *